H. N. SUHRE.
ROACH TRAP.
APPLICATION FILED MAY 16, 1911.
1,018,277.
Patented Feb. 20, 1912.
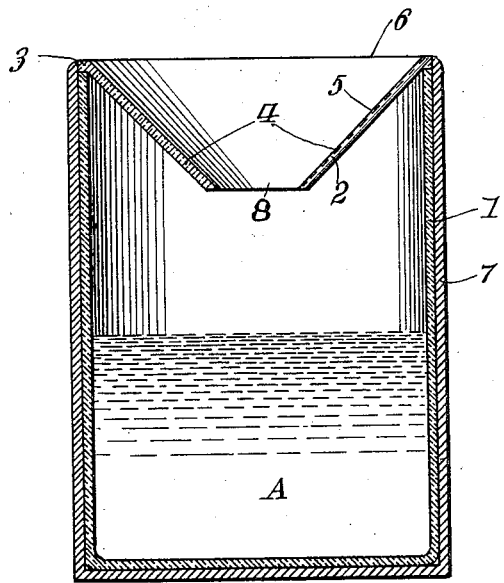
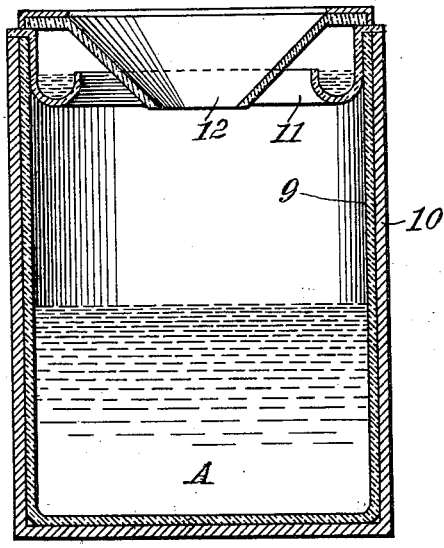
Witnesses
M. H. Slifer
Inventor
Henry N. Suhre
By Victor J. Evans
Attorney

UNITED STATES PATENT OFFICE.

HENRY N. SUHRE, OF SPARROWS POINT, MARYLAND.

ROACH-TRAP.

1,018,277. Specification of Letters Patent. Patented Feb. 20, 1912.

Application filed May 16, 1911. Serial No. 627,474.

*To all whom it may concern:*

Be it known that I, HENRY N. SUHRE, a citizen of the United States, residing at Sparrows Point, in the county of Baltimore and State of Maryland, have invented new and useful Improvements in Roach-Traps, of which the following is a specification.

This invention relates to roach traps, and has for an object to provide a device of this character which will include means for positively attracting the roaches and for causing them to be positively retained or held against escape.

In the drawing, forming a portion of this specification and in which like numerals of reference indicate similar parts in the several views:—Figure 1 is a vertical section through the trap. Fig. 2 is a similar view showing a slightly modified form of the invention.

The roach trap comprises an inner receptacle 1 of glass or other such suitable material which is capable of containing water. The trapping member 2 is substantially of funnel form, being provided with an upper horizontal supporting flange 3 and downwardly inclined walls 4. The trapping member is preferably formed of glass and is provided with a glazed surface 5 and a ground surface 6, the latter being formed on the top of the flange 3 and the former being formed on the tread surface of the walls 4. The receptacle 1 is incased in a suitable lead-forming casing 7 which may be constructed of cardboard, the same forming a roughened surface on the outside of the receptacle 1 so that the roaches can successfully climb thereon and travel in the direction of the ground surface 6 of the trapping member. The trapping member is formed at its lower end with a discharge opening 8.

In operation, the roaches will travel upwardly on the lead 7 and be attracted thereupon into the trapping member, the underside of said member being previously coated with a suitable baiting substance such as molasses, condensed milk, or other food stuffs. The roaches in their attempt to locate the bait will be invited downwardly upon the glazed surface 5 of the trapping member and owing to the inclination of the walls 4 of the member the roaches in the event of their slipping on the surface 5 will fall downwardly to be discharged through the opening and into the water or other suitable liquid A which is placed in the receptacle 1 below the trapping member.

In the form of the invention shown in Fig. 2, the receptacle 9 is inclosed in a casing 10 which is substantially identical with that described in the preferred form of the invention, the difference being in the provision of a bait trough or container 11 which is located within the receptacle 9 at the upper end thereof, being arranged in embracing relation with the trapping member 12. In this form of the invention the baiting substance may be placed in the trough 11, as is obvious.

I claim:

An insect trap comprising an outer receptacle having a roughened outer surface, an inner receptacle removably fitted to the outer receptacle, a substantially inverted conical trapping member open at both ends and having its small end extended in the direction of the bottom of the said inner receptacle, the said trapping member being removably fitted to the inner receptacle, and a rough surface located at the intake end of the said trapping member.

In testimony whereof I affix my signature in presence of two witnesses.

HENRY N. SUHRE.

Witnesses:
JOHN H. K. SHANNAHAN, Jr.,
JOHN F. SUHRE.